United States Patent [19]

Wadsworth

[11] 3,868,439

[45] Feb. 25, 1975

[54] METHOD OF INCREASING COPPER PRODUCTION

[75] Inventor: Milton E. Wadsworth, Salt Lake City, Utah

[73] Assignee: University of Utah, Salt Lake City, Utah

[22] Filed: Feb. 9, 1973

[21] Appl. No.: 331,140

[52] U.S. Cl.......................... 423/41, 75/117, 299/5, 423/27
[51] Int. Cl............................................. C22b 15/08
[58] Field of Search .............. 299/5; 423/27, 41, 45, 423/557; 75/101 R, 104, 117

[56] References Cited
UNITED STATES PATENTS

| | | | |
|---|---|---|---|
| 1,032,400 | 7/1912 | Günther................................ | 423/41 |
| 2,242,217 | 5/1941 | Amenabar............................. | 75/117 |
| 2,357,990 | 9/1944 | Amenabar......................... | 75/117 X |
| 2,563,623 | 8/1951 | Scott..................................... | 75/104 |
| 2,829,964 | 4/1958 | Zimmerley et al................. | 75/117 X |
| 3,260,593 | 7/1966 | Zimmerbly et al. .................. | 75/104 |
| 3,330,650 | 7/1967 | Zimmerley et al..................... | 75/104 |
| 3,441,316 | 4/1969 | Hannifan et al. .................. | 423/27 X |

Primary Examiner—Oscar R. Vertiz
Assistant Examiner—Gary P. Straub

[57] ABSTRACT

A method of selectively alternating the oxidation, acid wetting, and leach cycles used on a low grade copper bearing ore or overburden body to thereby enhance the rate of copper recovery therefrom. Control of the pH of the aqueous solution used during the acid wetting phase to a pH value within the range of 1.0 to 2.0 has been found to be unusually significant.

2 Claims, No Drawings

METHOD OF INCREASING COPPER PRODUCTION

The research that led to this invention was initiated to investigate the role of atmospheric oxygen in the recovery of copper values by the leaching of copper overburden and/or waste dumps. The problem of increasing the recovery rate of copper from these waste dumps is of great importance when one considers that there are, by conservative estimates, in excess of 15 billion pounds of copper located in waste dumps in the Western United States alone. From the foregoing it becomes readily apparent why there is an increased interest in recovering additional copper from these dumps on a large scale and more efficiently.

These waste dumps are comprised of extremely large tonnages of low-grade material which is placed on the dumps each day during the copper mining operation (usually open pit operations) not only in the Western United States but also throughout the world. These waste dumps range in size from approximately 5.5 million tons at Mineral Park, Arizona to approximately 4 billion tons at the Bingham, Utah operation. The copper values are generally contained in these dumps as an oxidized copper mineral such as azurite, malachite, chrysocolla, cuprite, or tenorite or some other mineral of copper.

The usual practice in dump leaching is to leach a portion of the dump for a given period of time, after which the flow of solution to that area is terminated. The dump is then allowed to "rest" during which period air or oxygen is allowed to penetrate the dump as the leach solution continues to drain out of the dump. The oxygen from the atmosphere reacts with the sulfide minerals in the dump thereby producing copper salts which are soluble in the acidic leach solutions. When this rest or aeration cycle is completed, the dump area is again leached to remove additional copper. This pattern of alternating the leach and rest cycles is usually followed for several years.

The liquid or pregnant liquor emerging from the base of the dump is collected and subjected to the necessary processing for removal of the copper ions suspended therein, usually by precipitation or solvent extraction. The barren solution is then returned to the dump, usually after the addition of make-up water and sulfuric acid for the adjustment of the pH. The leach solutions that are recycled contain ferrous and ferric sulfates in addition to large quantities of dissolved aluminum, magnesium and calcium salts which may be present in the dump. Iron is introduced into the leach solution by the dissolution of the iron bearing minerals present in the ore deposit. In addition to the iron from the dump leaching itself, iron is also introduced into the solution during the precipitation process when the pregnant liquor is passed over metallic scrap iron in those processes where cementation is used to remove the copper from solution. Iron is also introduced in the form of ferric sulfate since it has been found useful as an oxidizing agent for the attack on sulfide minerals, however, most of the iron returning to the dump in the leach solution is in the ferrous form. This latter results from the rapid reduction of the ferric iron to the ferrous iron condition during the cementation process as represented by the reaction.

$$2Fe^{+3} + Fe^0 = 3Fe^{+2}$$

Also, at pH values above 2.5, ferric iron precipitates as basic iron sulfate thus limiting its concentration in solution. The rate of oxidation of ferrous iron to ferric is very slow even for relatively long periods of impounding. Consequently, removal of iron from the leach system is relatively slow unless there are special provisions made for oxidation. Nucleation for precipation of basic iron sulfates appears to be important thus there is a greater possibility for precipitation within the confines of the dump itself rather than in an open pond assuming conditions are favorable thermodynamically.

It is, therefore, an object of this invention to provide improvements in the art of extracting copper values by aqueous leaching of ore bodies.

This and other objects of this invention will be readily apparent from the following description and claims.

It has been found through the laboratory study that the amount of oxygen uptake or degree of oxidation has been found to be directly proportional to the amount of copper that will subsequently be released from an overburden dump of the copper mine when the subject dump is leached according to the present invention. Or, stated another way, the inventor has discovered that the release of copper from the ore particle so that it may be removed by the leaching cycle is directly proportional to the amount of oxygen that is taken up by the dump.

The oxidation rate has been found to be dependent upon the pH of the solution wetting the particles. A smaller particle size, within limits, also increased the oxidation rate and therefore the amount of oxygen uptake in a given time period. It has been found by means of a material balance on the system that one mole of oxygen absorbed by the system yielded in excess of one mole of copper in solution. By exercising suitable care in the control of the pH of the solutions used to wet the dump, aqueous sulfuric acid, pH 1.0 to 2.0, the oxygen uptake by the dump is enhanced resulting in an increased copper release during the alternation of the oxidation, acid wetting, and leach cycles. Oxygen uptake is enhanced by leaching the ore body in the presence of aqueous sulfuric acids with pH values between 1.0 and 2.0. This is especially useful in highly siliceous materials, that is, those containing a high degree of silica and/or silicates since these types of ores are generally considered to be relatively non-acid consuming. According to the present invention, oxygen uptake is enhanced by altering the conventional leach/rest cycle by the method of following a leach cycle with an acid wetting cycle which is then followed by the rest cycle. These latter two cycles of aqueous solution consisting essentially of sulfuric acid wetting with an acid of pH 1.0–2.0 followed by a rest cycle may be suitably repeated before the dump is again subjected to the leach cycle. During the acid wetting cycle it is generally considered undesirable to apply sufficient acid for the acid to begin percolating from the base of the dump. Instead, the acid should be applied in sufficient quality to only wet the ore material. Once the ore material has been suitably wetted by the sulfuric acid of the preselected acid pH range, pH 1.0 to 2.0 the ore body should be allowed to rest in order for the atmospheric oxygen to suitably penetrate within the dump and therein oxidize the copper sulfide ores. It is only through this oxidation that these copper values will be released from the ore in order that the leach cycle may thereafter remove said copper. The foregoing steps of acid wetting and aeration or rest cycles may be suitably repeated several times before the dump system is again subjected to the standard leaching procedures.

The prior art's method of leaching an overburdened dump comprise leaching with an aqueous acid solution having a pH range on the order of about 2.0–3.0. Thereafter the dump is allowed to rest for anywhere generally from 2 weeks to 30 days. The time spent during the leaching cycle generally runs from one-fifth to 1/50 of the rest cycle. Thus it can easily be seen that the prior art methods comprise leaching with an acid solution and then alternating this leach cycle with a rest period of considerably greater length of time.

The inventor has discovered that by altering this cycle by the addition of an acid wetting cycle suitably repeated with rest cycles prior to a further leach cycle greatly enhances the recovery of copper values from the ore body undergoing the leaching operation. For example, during a three week rest cycle, the ore body may be wetted three times with the aqueous solution of sulfuric acid, pH 1.0 to 2.0 followed by one week rest cycles and then subjected to the standard leaching operation. During the acid wetting operation, there should be sufficient acid applied in order to replace or at least acidify the pellicular water therein.

The net leaching rate for the copper release was found to increase when the pH of the acid wetting solution was lowered to within certain limits. Test results indicate that a basic iron sulfate forms in pores and cracks and on the mineral surfaces to thereby slow down or otherwise inhibit the oxidation process. The leaching of the copper tends to slow down or even to cease at a pH greater than approximately 2.5 or 2.6. This latter phenomena has been attributed to the formation of basic iron sulfate which blocks the access of the solubilized copper to the leach solutions.

Since a dry ore body will not absorb oxygen, dump leaching is assumed to be electrochemical in character. This is shown by the fact that oxygen uptake by the ore particles begins as soon as the surfaces of the ore particles are wetted. In addition to enhancing kinetics by oxygen uptake, the presence of low pH solutions on surfaces and in cracks and pores of the ore particle delays internal pH excursions leading to the precipitation of salts in the particle. It has been found that optimum oxidation or oxygen uptake occurs when the ore mass is initially wetted and then drained. This wetting provides the electrolyte for the anodic and cathodic mineral reactions and thereby leaves larger pores and cracks available in the ore particle for ingress of gaseous oxygen.

It has further been found that the diffusion path for oxygen should be kept as short as possible. It has been demonstrated previously that the diffusion rate of oxygen is very slow due to its low solubility with the result that if ore particles are completely immersed in the bulk solution, effective oxidation by gaseous oxygen is virtually impossible because of the relatively long diffusion paths.

Water, as the electrolyte or solution medium, is generally present in various forms. Pellicular water, that is, water uninfluenced by gravity, is an important consideration during the oxidation cycle. Solubilized salts, which include copper, must diffuse into the pellicular water reservoir in the smallest pores, cracks and/or capillaries within the ore particle. It is here that the released metal values such as copper are stored until the leach cycle begins. If pH excursions within the pellicular water phase increase above 2.5 to 2.6, salts will precipitate thereby limiting further oxidation and furthermore blocking the copper extraction. The capacity of the dump for storage of this pellicular or non-gravitational water is thus a very important feature of dump leaching due to its capacity to store solubilized metal values. The storage of pellicular water may be so very large for very fine materials that oxidation is extremely slow due to very long interparticle diffusion paths.

The foregoing results indicate that rest cycles during which oxidation can occur are the most essential feature of dump leaching if sulphide minerals are present. The effective length of such rest cycles may be extended if solutions of low pH are introduced sufficient to provide thin films and a reservoir of pellicular water at a low pH.

The pH of these solutions depends upon several factors. Even from the point of view of economics, it appears feasible that the sulfuric acid inventory necessary to generate aqueous solutions of sulfuric acid in the pH range of 1.0–2.0 in sufficient volume to sufficiently wet the ore will be more than realized in increased copper production. However, there are other factors which may seriously limit the use of solutions of too low a pH. Bacterial activity, as one example, is greatly diminished at pH of 1.0 and is essentially eliminated at a pH below 1.0. Additionally, at these low pH values gangue minerals dissolve and thus consume acid and form altered products such as clays and basic metal sulfate. Furthermore, the buffering action of recycle solutions may limit effective pH control. There is, therefore, an optimum pH (within the range of 1.0 to 2.0 pH) characteristic of a given ore body which will optimize (1) bacterial activity, (2 rate of oxidation, and (3) acid consumption.

As additional material is placed on the dump, it should be wetted with the aqueous solution of acid having a pH of 1.0 to 2.0 if enhanced oxidation is expected to occur. Acid should also be added to neutralize acid consuming constituents and also to limit precipitation of basic iron salts as much as possible. The amount of acid necessary in order to adequately neutralize the acid consuming constituents and limit precipitation of basic iron salts can be determined by titrating crushed ore samples in the laboratory. The use of excessive acid would be self defeating due to rapid dissolution of gangue constituents at high hydrogen ion concentrations.

Also, difficulties with in-situ leaching may be encountered in draining the ore deposit sufficiently for effective ingress of oxygen by reason of the presence of ground water. This ground water will inhibit the drainage of water other than pellicular water thereby defeating the ability to maximize oxidation. Bubbling oxygen through a solution-innundated deposit has only limited effectiveness because the diffusion paths will still be considered relatively long as previously explained. Similarly, counter-current or simultaneous leaching and oxidation will be of a limited effectiveness if the rate of leaching is very slow such that the larger pores and cracks are not constantly filled with leach solution.

I claim:

1. In a method of enhancing recovery of copper values from an ore material having relatively low copper values; the method comprising sequentially:

preparing the ore material for a subsequent leaching by first wetting the ore material with a first solution consisting essentially of aqueous sulfuric acid having a pH within the range on the order of about 1.0 to 2.0, the wetting step comprising applying sufficient aqueous sulfuric acid to the ore material to at least acidify pellicular water in the ore material without causing a significant amount of the sulfuric acid to percolate from the ore material;

exposing the ore material to the atmosphere until aeration occurs; and conducting a leaching step for extracting copper values from the ore material by percolating a second solution comprising a solution of sulfuric acid and iron ions through the ore material and collecting the second solution for processing to recover copper values therefrom.

2. The method of claim 1 wherein the steps of wetting the ore material with said sulfuric acid and exposing said ore material to the atmosphere are repeated before said ore material is leached.

* * * * *